US008645703B2

(12) United States Patent
Ebeid

(10) Patent No.: US 8,645,703 B2
(45) Date of Patent: *Feb. 4, 2014

(54) POWER ANALYSIS COUNTERMEASURE FOR THE ECMQV KEY AGREEMENT ALGORITHM

(75) Inventor: Nevine Maurice Nassif Ebeid, Kitchener (CA)

(73) Assignee: Blackberry Limited, Waterloo (CA)

( * ) Notice: Subject to any disclaimer, the term of this patent is extended or adjusted under 35 U.S.C. 154(b) by 52 days.

This patent is subject to a terminal disclaimer.

(21) Appl. No.: 13/489,690

(22) Filed: Jun. 6, 2012

(65) Prior Publication Data

US 2012/0254620 A1    Oct. 4, 2012

Related U.S. Application Data

(63) Continuation of application No. 12/040,212, filed on Feb. 29, 2008, now Pat. No. 8,219,820.

(60) Provisional application No. 60/893,526, filed on Mar. 7, 2007.

(51) Int. Cl.
*H04L 9/32* (2006.01)
*H04K 1/00* (2006.01)

(52) U.S. Cl.
USPC .............. 713/180; 713/168; 713/178; 380/28

(58) Field of Classification Search
USPC ................ 713/150–159; 709/229; 380/28–30
See application file for complete search history.

(56) References Cited

U.S. PATENT DOCUMENTS

| 5,889,865 | A | 3/1999 | Vanstone et al. |
| 6,785,813 | B1 | 8/2004 | Vanstone et al. |
| 7,260,723 | B2 * | 8/2007 | Johnson et al. ............... 713/180 |
| 8,219,820 | B2 | 7/2012 | Ebeid |
| 2003/0123654 | A1 * | 7/2003 | Lambert ......................... 380/28 |
| 2003/0194086 | A1 | 10/2003 | Lambert |
| 2005/0114651 | A1 | 5/2005 | Qu et al. |

OTHER PUBLICATIONS

Guide to Elliptic Curve Cryptography; Darrel Hankerson et al.; Springer; 2004; p. 1-332.*
Guide to Elliptic Curve Cryptgraphy; Darrel Hankerson et al.; Springer; 2004; p. 3, 5, 13, 96, 103, 193-196.
Scott Vanstone, Certicom's Bulletin of Security and Cryptography Code Cipher, Code and Cipher vol. I, No. 2., Certicom Corp Mississauga, Ontario, Canada, 2003.
Darrel Hankerson; Alfred Menezes; Scott Vanstone; Chapter 4: Cryptographic Protocal Ed, Guide to Elliptic Curve Cryptography, Springer, pp. 153-204, Jan. 1, 2004.
Thomas S. Messerges, Power Analysis Attacks and Countermeasures for Cryptographic Algorithms Dissertation, Jan. 1, 2000.

(Continued)

*Primary Examiner* — Evans Desrosiers
(74) *Attorney, Agent, or Firm* — Ridout & Maybee LLP

(57) ABSTRACT

Execution of the ECMQV key agreement algorithm requires determination of an implicit signature, which determination involves arithmetic operations. Some of the arithmetic operations employ a long-term cryptographic key. It is the execution of these arithmetic operations that can make the execution of the ECMQV key agreement algorithm vulnerable to a power analysis attack. In particular, an attacker using a power analysis attack may determine the long-term cryptographic key. By modifying the sequence of operations involved in the determination of the implicit signature and the inputs to those operations, power analysis attacks may no longer be applied to determine the long-term cryptographic key.

7 Claims, 4 Drawing Sheets

(56) References Cited

OTHER PUBLICATIONS

Trichina E. et al, Implementation of Elliptic Curve Cryptography with Built-In Counter Measures Against Side Channel Attacks, Cryptographic Hardware and Embedded Systems, International Workshop, Aug. 13, 2002.

EPO, Extended Search Report, relating to application No. 08722551.9 dated Sep. 8, 2010.

* cited by examiner

POWER ANALYSIS COUNTERMEASURE FOR THE ECMQV KEY AGREEMENT ALGORITHM

CROSS REFERENCE TO RELATED APPLICATIONS

The present application is a continuation of U.S. patent application Ser. No. 12/040,212, filed Feb. 29, 2008. U.S. patent application Ser. No. 12/040,212 claims priority to U.S. Provisional Patent Application Ser. No. 60/893,526, filed Mar. 7, 2007, the contents of both applications are hereby incorporated herein by reference.

The present application is related to US Patent Application Publication No. 2008/0219438, the contents of which are hereby incorporated herein by reference.

The present application is related to US Patent Application Publication No. 2008/0219437, the contents of which are hereby incorporated herein by reference.

The present application is related to US Patent Application Publication No. 2008/0219450, the contents of which are hereby incorporated herein by reference.

The present application is related to US Patent Application Publication No. 2008/0275932, the contents of which are hereby incorporated herein by reference.

The present application is related to US Patent Application Publication No. 2008/0301458, the contents of which are hereby incorporated herein by reference.

The present application is related to US Patent Application Publication No. 2008/0273694, the contents of which are hereby incorporated herein by reference.

FIELD OF THE INVENTION

The present application relates generally to cryptography and, more specifically, to measures for countering a power analysis attack on a physical implementation of the Elliptic Curve Menezes-Qu-Vanstone (ECMQV) Key Agreement Algorithm.

BACKGROUND OF THE INVENTION

Cryptography is the study of mathematical techniques that provide the base of secure communication in the presence of malicious adversaries. The main goals of secure communication include confidentiality of data, integrity of data and authentication of entities involved in a transaction. Historically, "symmetric key" cryptography was used to attempt to meet the goals of secure communication. However, symmetric key cryptography involves entities exchanging secret keys through a secret channel prior to communication. One weakness of symmetric key cryptography is the security of the secret channel. Public key cryptography provides a means of securing a communication between two entities without requiring the two entities to exchange secret keys through a secret channel prior to the communication. An example entity "A" selects a pair of keys: a private key that is only known to entity A and is kept secret; and a public key that is known to the public. If an example entity "B" would like to send a secure message to entity A, then entity B needs to obtain an authentic copy of entity A's public key. Entity B encrypts a message intended for entity A by using entity A's public key. Accordingly, only entity A can decrypt the message from entity B.

For secure communication, entity A selects the pair of keys such that it is computationally infeasible to compute the private key given knowledge of the public key. This condition is achieved by the difficulty (technically known as "hardness") of known mathematical problems such as the known integer factorization mathematical problem, on which is based the known RSA algorithm, which was publicly described in 1977 by Ron Rivest, Adi Shamir and Leonard Adleman.

Elliptic curve cryptography is an approach to public key cryptography based on the algebraic structure of elliptic curves over finite mathematical fields. An elliptic curve over a finite field, K, may be defined by a Weierstrass equation of the form $$y^2+a_1xy+a_3y=x^3+a_2x^2+a_4x+a_6. \quad (1.1)$$

If $K=F_p$, where p is greater than three and is a prime, equation (1.1) can be simplified to $$y^2=x^3+ax+b. \quad (1.2)$$

If $K=F_{2^m}$, i.e., the elliptic curve is defined over a binary field, equation (1.1) can be simplified to $$y^2+xy=x^3+ax^2+b. \quad (1.3)$$

The set of points on such a curve (i.e., all solutions of the equation together with a point at infinity) can be shown to form an abelian group (with the point at infinity as the identity element). If the coordinates x and y are chosen from a large finite field, the solutions form a finite abelian group.

Elliptic curve cryptosystems rely on the hardness of a problem called the Elliptic Curve Discrete Logarithm Problem (ECDLP). Where P is a point on an elliptic curve E and where the coordinates of P belong to a finite field, the scalar multiplication kP, where k is a secret integer, gives a point Q equivalent to adding the point P to itself k times. It is computationally infeasible, for large finite fields, to compute k knowing P and Q. The ECDLP is: find k given P and Q (=kP).

BRIEF DESCRIPTION OF THE DRAWINGS

Reference will now be made to the drawings, which show by way of example, embodiments of the invention, and in which.

DETAILED DESCRIPTION OF THE EMBODIMENTS

Figure 1:
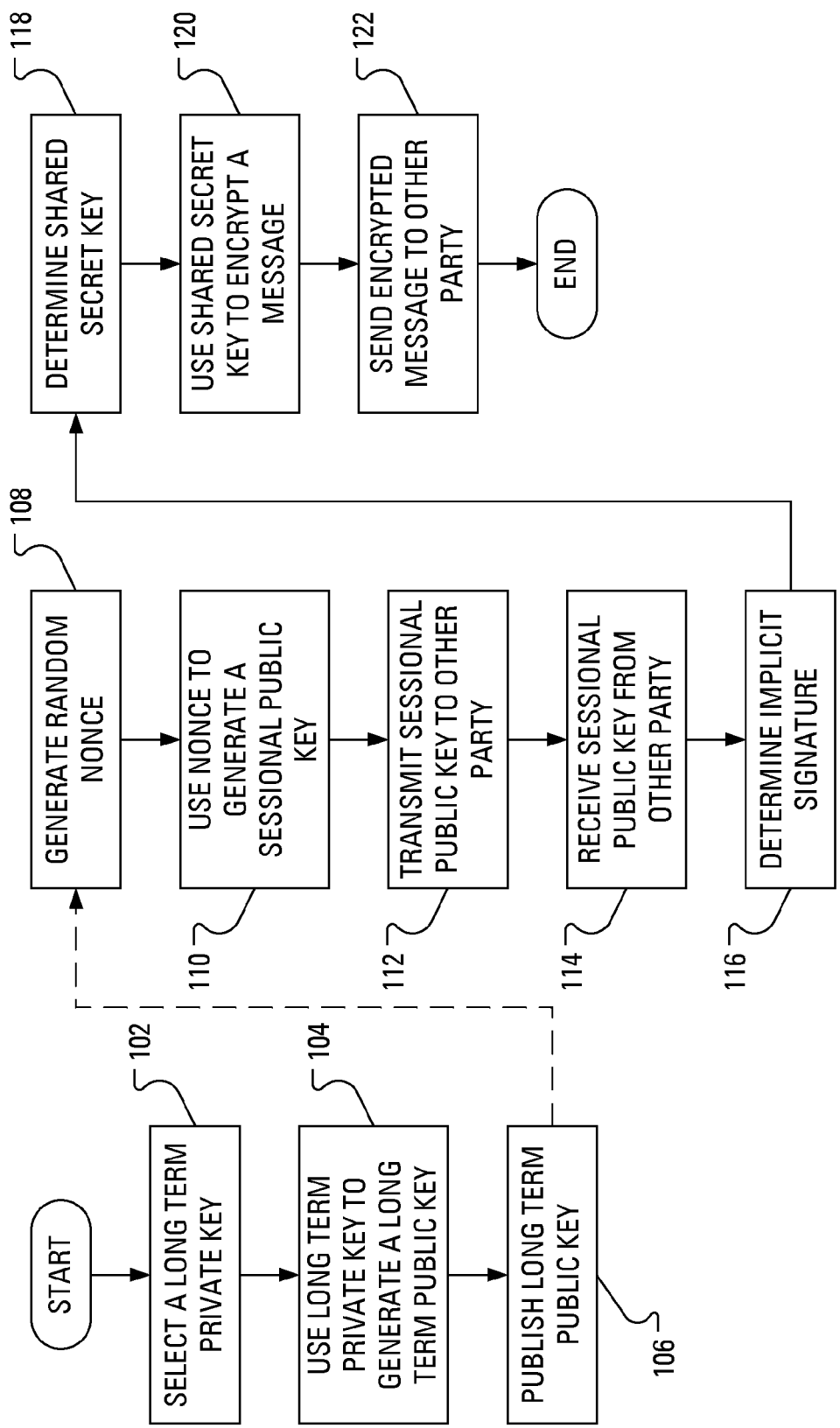
FIG. 1 illustrates steps of a typical method of carrying out the ECMQV key agreement algorithm.

By providing variation in arithmetic operations in which a long-term key is involved obviates the vulnerability in the determination of an implicit signature during execution of the ECMQV key agreement algorithm. That is, by modifying the sequence of operations involved in the determination of the implicit signature and the inputs to those operations, DPA attacks lose applicability.

In accordance with an aspect of the present application there is provided a method of encrypting a message in a manner that counters power analysis attacks, wherein a long-term private cryptographic key has been selected and a long-term public cryptographic key has been determined based on the long-term private cryptographic key and a base point on a given elliptic curve. The base point has a prime order. The method includes determining a modular inverse of the long-term private cryptographic key, generating a sessional private cryptographic key and a sessional public cryptographic key, determining an implicit signature based on the modular inverse of the long-term private cryptographic key, the sessional private cryptographic key, the sessional public cryptographic key and the long-term private cryptographic key, determining a shared secret cryptographic key based on the implicit signature and encrypting a message using the shared secret cryptographic key. In other aspects of the present application, a mobile communication device is provided for carrying out this method and a computer readable medium is provided for adapting a processor to carry out this method.

In accordance with another aspect of the present application there is provided a method of encrypting a message in a manner that counters power analysis attacks, wherein a long-term private cryptographic key has been selected and a long-term public cryptographic key has been determined based on the long-term private cryptographic key and a base point on a given elliptic curve. The base point has a prime order. The method includes generating a sessional private cryptographic key and a sessional public cryptographic key, generating a random number, determining an implicit signature based on the random number, the sessional private cryptographic key, the sessional public cryptographic key and the long-term private cryptographic key, determining a shared secret cryptographic key based on the implicit signature and encrypting a message using the shared secret cryptographic key. In other aspects of the present application, a mobile communication device is provided for carrying out this method and a computer readable medium is provided for adapting a processor to carry out this method.

Other aspects and features of the present invention will become apparent to those of ordinary skill in the art upon review of the following description of specific embodiments of the invention in conjunction with the accompanying figures.

In general, a device implementing an Elliptic Curve Cryptosystem selects a value for a secret key, k, which may be a long-term secret key or a short-term secret key. Additionally, the device has access to a "base point", P. The device then generates Q=kP and publishes Q as a public key. Q may then be used for encryption or may then be used in a key agreement protocol such as the known Elliptic Curve Diffie-Hellman (ECDH) key agreement protocol. In the known Elliptic Curve Menezes-Qu-Vanstone (ECMQV) key agreement protocol, and the known Elliptic Curve Digital Signature Algorithm (ECDSA), each entity has a pair of keys (public key, private key), say, for entity A, this pair is $(Q_A, d_A)$. This is long-term pair, hence $Q_A = d_A P$ is computed once per key life. Notably, in another step of the ECMQV key agreement protocol and the ECDSA, there is a random integer k that is multiplied by the base point P, i.e., kP is determined.

The general point of an attack on a cryptosystem is to determine the value of the private key. Recently, especially given the mathematical difficulty of solving the ECDLP, cryptosystem attacks have been developed that are based on careful measurements of the physical implementation of a cryptosystem, rather than theoretical weaknesses in the algorithms. This type of attack is called a "side channel attack". In one known example side channel attack, a measurement of the exact amount of time taken by known hardware to encrypt plain text has been used to simplify the search for a likely private key. Other examples of side channel attacks involve measuring such physical quantities as power consumption, electromagnetic leaks and sound. Many side channel attacks require considerable technical knowledge of the internal operation of the system on which the cryptography is implemented. In particular, a power monitoring attack involves obtaining information useful to the determination of a private key by observing properties of electricity in the power lines supplying hardware implementing the cryptosystem.

In a Simple Power Analysis (SPA) attack, an attacker monitors the power consumption of a device to visually identify large features of the scalar multiplication operation, kP. Indeed, monitoring of the power consumption during a scalar multiplication operation may enable an attacker to recognize exact instructions as the instructions are executed. For example, consider that the difference between the power consumption for the execution of a point doubling (D) operation and power consumption for the execution of a point addition (A) operation is obvious. Then, by investigating one power trace of a complete execution of a double-and-add algorithm employed to perform a scalar multiplication, the bits of the scalar private key k may be revealed. In particular, whenever a D operation is followed by an A operation, the corresponding bit $k_i=1$, otherwise if a D operation is followed by another D operation, then $k_i=0$. This sequence of point operations is referred to as a DA sequence.

In a Differential Power Analysis (DPA) side-channel attack, an attacker exploits the varying power consumed by a microprocessor while the microprocessor executes cryptographic program code. Using statistical analysis of the power consumption measurements of many runs of a given cryptographic algorithm, the attacker may infer information about a secret key used in the given cryptographic algorithm. A DPA attack on a scalar multiplication algorithm may be based on collecting hundreds of power consumption measurements obtained during the execution of the scalar multiplication with the same private key. Even if the execution is SPA-resistant, a statistical analysis on the measurements collected can still reveal the private key.

According to Code and Cipher, Vol. 1, no. 2, 2003, available at www.certicom.com, the ECMQV key agreement algorithm is used to establish a shared secret key K between parties who already possess trusted copies of each other's static public keys. Both parties still generate dynamic public and private keys and then exchange public keys. However, upon receipt of the other party's public key, each party calculates a quantity called an implicit signature. The shared secret key K is then generated from the implicit signature. The term implicit signature is used to indicate that the shared secret keys will not agree if the other party's public key is not employed in the generation of the shared secret key, thus giving implicit verification that the shared secret key was established with the desired party. An attempt at interception provides an attacker C with a set of public keys $Q_A$, $Q_B$, $R_A$, $R_B$ and no way to properly generate the shared secret key.

A key agreement algorithm generally involves two parties. For the sake of example, we will consider Alice (A) and her Bank (B). Typical operation of the ECMQV key agreement algorithm (see FIG. 1) begins with both parties having already generated and published their respective long-term public keys. That is, Alice's processor has selected (step 102) a long-term private key, $d_A$, and used the long-term private key to generate (step 104) a long-term public key, $Q_A$. The Bank possesses a key pair $(Q_B, d_B)$ with $Q_B$ being the Bank's public key and $d_B$ being the Bank's private key. Additionally, it is assumed that Alice has received the Bank's public key $Q_B$ in some trusted manner and that Alice's processor has published (step 106) the public key $Q_A$ in some trusted manner so that the Bank has received Alice's public key.

At some later time, for a secure session with her Bank, Alice's processor generates a sessional key pair by first randomly generating a nonce $k_A$ (step 108) and then determining $R_A = k_A P$ (step 110), where $k_A$ is an integer, P is a base point on an elliptic curve and $R_A$ is another point on the same elliptic curve. Alice's processor then provides $R_A$ to the Bank (step 112) as a sessional public key. The Bank also generates a sessional key pair ($R_B$, $k_B$) by randomly generating a nonce $k_B$ and determining $R_B = k_B P$. The Bank then provides $R_B$ to Alice as a sessional public key and Alice's processor receives (step 114) the Bank's sessional public key.

Alice's processor then determines (step 116) a value for an "implicit signature", $S_A$, $$S_A = (k_A + \overline{R}_A d_A) \bmod u \qquad (1.4)$$

where the modulus u is the order of the base point P. The Bank determines an implicit signature, $S_B$, in a similar manner, $$S_B = (k_B + \overline{R}_B d_B) \bmod u. \qquad (1.5)$$

Here $\overline{R}_A$ (or $\overline{R}_B$) represents a function of the sessional public key. For instance, the function of the sessional public key may be the first L bits of a component of the point $R_A$ (or $R_B$), where $$L = \left\lceil \frac{(\lceil \log_2 u \rceil + 1)}{2} \right\rceil. \qquad (1.6)$$

Alice's processor then determines (step 118) a value for a shared secret key $K_A$:

$$K_A = h S_A (R_B + \overline{R}_B Q_B), \qquad (1.7)$$

where h is a co-factor defined in IEEE P1363.2/D20.1—Draft Standard Specifications for Password-based Public Key Cryptographic Techniques, Apr. 4, 2005, a draft of which is available at grouper.ieee.org/groups/1363/passwdPK/draft.html.

The Bank also determines a value for a shared secret key $K_B$:

$$K_B = h S_B (R_A + \overline{R}_A Q_A). \qquad (1.8)$$

Conveniently, $K_A = K_B$, as a result, we can simply call the shared secret key "K". Since each party can independently determine K, there is no need to transmit K between parties. Alice's processor may encrypt a message (step 120) using the shared secret key K and transmit (step 122) the encrypted message to the Bank. Upon receiving the encrypted message, the Bank may use the shared secret key K to decrypt the message.

The Applicant has recognized a vulnerability in the ECMQV key agreement algorithm, in the determination of the implicit signature (step 110), that is, in the evaluation of equation (1.4). Since Alice's processor has published $R_A$ (step 112), it may be assumed that the value $\overline{R}_A$ is known to an attacker. Where the attacker uses a DPA attack on the modular integer multiplication of the known value $\overline{R}_A$ and the unknown value $d_A$, the attacker may be able to determine the long-term private key, $d_A$.

It would be desirable to execute the ECMQV key agreement algorithm to obtain a shared secret key for use in encrypting messages, where such execution resists revealing the long-term key to an attacker that is using a DPA attack.

To that end, we turn our attention to a countermeasure that has been developed for the ECDSA. Given a base point, P, of prime order g, a private key, d, and a message, M, the ECDSA may be used to determine a signature (r, s), where the elements of the signature, r and s, are integers in [1, g−1]. During the execution of the ECDSA, the message M is subjected to a cryptographic hash function, m=H(M). Furthermore, a random number, k, is selected and used to determine a public key, Q=kP. A first portion of the signature, r, is determined from r=x(Q) mod g. A second portion of the signature, s, is determined from $$s = k^{-1}(m + dr) \bmod g. \qquad (1.9)$$

The order of operations in the obtaining of s in equation (1.9) begins with a first modular multiplication operation, $\xi = d_A r \bmod g$, followed by a modular addition operation, $\beta = (m + \xi) \bmod g$, and, finally, a second modular multiplication operation, $s = k^{-1} \beta \bmod g$ for a total of one modular inversion operation, two modular multiplication operations and one modular addition operation.

In Messerges, T., Power Analysis Attacks and Countermeasures for Cryptographic Algorithms, PhD thesis, University of Illinois, Chicago, 2000 (hereinafter "Messerges"), it is suggested that an attacker, given knowledge of r, may determine the private key, d, using a DPA attack. Conveniently, Messerges also proposes a countermeasure involving multiplying both m and d by a random value ω and, after determining $$s' = k^{-1}(m\omega + rd\omega) \bmod g, \qquad (1.10)$$

multiplying s' by $\omega^{-1}$. Note that the processor determines ($\xi = d\omega \bmod g$) first, then the processor determines ($r\xi \bmod g$). That is, due to the modulus operation, it is unnecessary for the processor to determine an intermediate value combining r with d. Accordingly, a second-order DPA attack as described by Messerges is not applicable.

Notably, equation (1.9) is similar to equation (1.4). Consequently, the countermeasure described by Messerges may also be used to resist DPA attacks on the determination of a solution to equation (1.4), i.e., equation (1.4) may be rewritten $$S_A = [(k_A \omega + \overline{R}_A d_A \omega) \bmod u] \omega^{-1}. \qquad (1.11)$$

Equation (1.11) may be considered a countermeasure against DPA attacks on the determination of the implicit signature during execution of the ECMQV key agreement algorithm.

Note that, when adapting the countermeasure described by Messerges to the determination of an implicit signature as presented in equation (1.4), the processor performs a first modular multiplication operation, $\xi = d_A \omega \bmod u$, a second modular multiplication operation, $\alpha = \overline{R}_A \xi \bmod u$, a third modular multiplication operation, $\chi = k_A \omega \bmod u$, a modular addition operation, $\beta = (\chi + \alpha) \bmod u$, a first modular inversion operation, $k^{-1} \bmod u$, a fourth modular multiplication operation, $s' = k^{-1} \beta \bmod u$, a second modular inversion operation, $\omega^{-1} \bmod u$, and a fifth modular multiplication operation, $s = s' \omega^{-1} \bmod u$ for a total of two modular inversion operations, five modular multiplication operations and one modular addition operation. Compared to the original ECDSA, the countermeasure proposed by Messerges involves one additional modular inversion operation and three additional modular multiplication operations. Notably, due to the modulus operation, it is unnecessary for the processor to determine an intermediate value combining r with $d_A$. Accordingly, a second-order DPA attack as described by Messerges is not applicable.

In overview, providing variation in the arithmetic operations in which the long-term key is involved obviates the vulnerability in the determination of the implicit signature during execution of the ECMQV key agreement algorithm. That is, by modifying the sequence of operations involved in the determination of the implicit signature and the inputs to those operations, DPA attacks, such as those described by Messerges, are not applicable.

Consider that equation (1.4) may be rewritten $$S_A = (k_A d_A^{-1} + \overline{R}_A) d_A \bmod u, \quad (1.12)$$

where $d_A^{-1} \bmod u$ may be determined and stored subsequent to the selection of $d_A$. Since $k_A$ is unknown to an attacker, the modulus multiplication to determine $k_A d_A^{-1} \bmod u$ does not provide the attacker with any useful information. Similarly, the modulus multiplication of the sum $(k_A d_A^{-1} + \overline{R}_A)$ by the long-term private key, $d_A$, provides the attacker with no information useful in revealing $d_A$.

Figure 2:
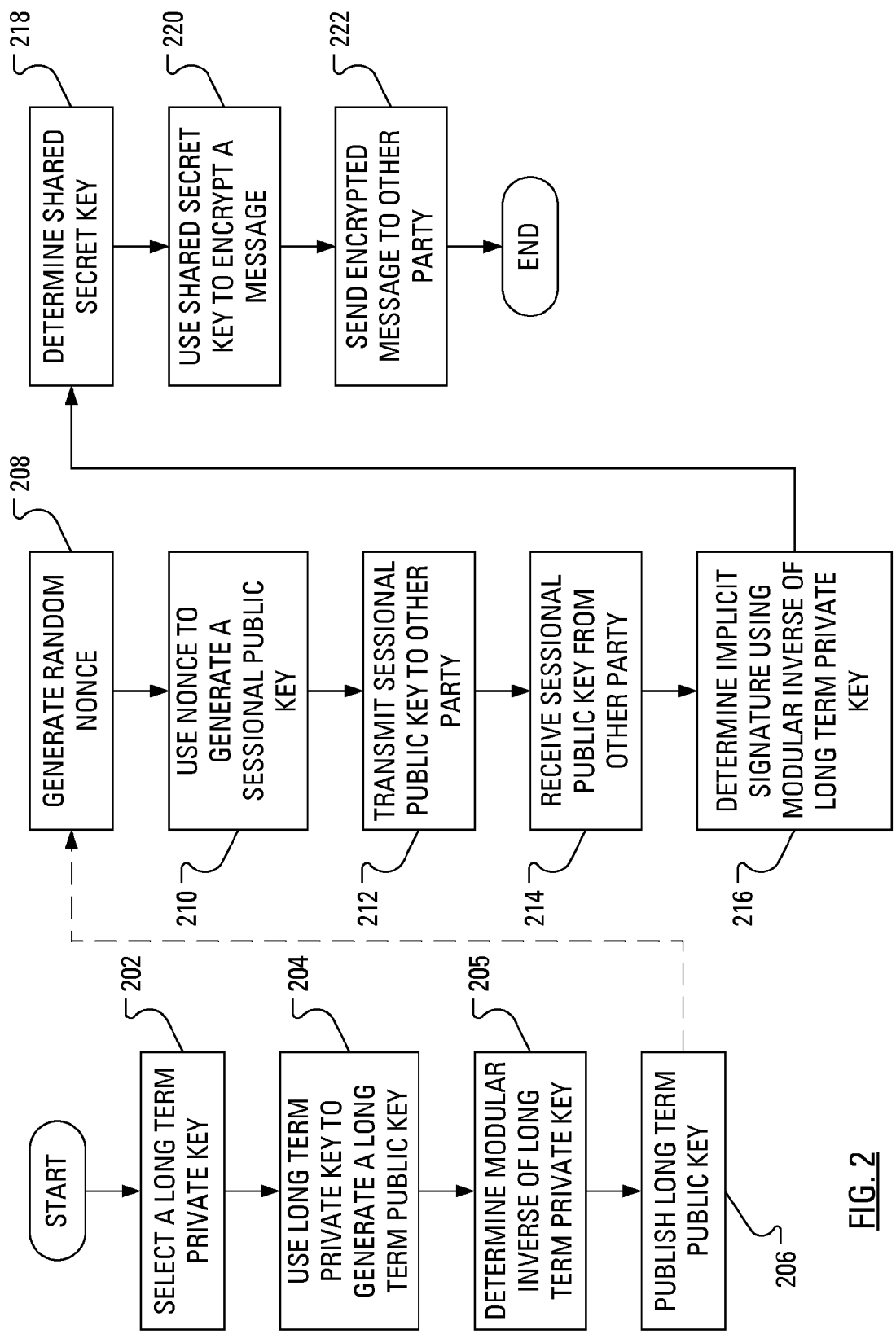
FIG. 2 illustrates steps of a first method of carrying out the ECMQV key agreement algorithm in a manner that counters a power analysis attack according to an embodiment.

Consider, in view of FIG. 2, execution of the ECMQV key agreement algorithm between Alice and her Bank. Initially, Alice's processor selects (step 202) a long-term private key, $d_A$, and uses the long-term private key to generate (step 204) a long-term public key, $Q_A$. Alice's processor also determines and stores (step 205) a modular inverse of the long-term private key. Alice's processor then publishes (step 206) the public key $Q_A$ in some trusted manner so that the Bank receives Alice's public key.

At some later time, for a secure session with her Bank, Alice's processor generates a sessional key pair by first randomly generating a nonce $k_A$ (step 208) and then determining $R_A = k_A P$ (step 210), where $k_A$ is an integer, P is a base point on an elliptic curve and $R_A$ is another point on the same elliptic curve. Alice's processor then provides $R_A$ to the Bank (step 212) as a sessional public key. The Bank also generates a sessional key pair $(R_B, k_B)$ by randomly generating a nonce $k_B$ and determining $R_B = k_B P$. The Bank then provides $R_B$ to Alice as a sessional public key and Alice's processor receives (step 214) the Bank's sessional public key.

Alice's processor then determines (step 216) a value for the implicit signature, while using the modular inverse of the long-term private key that was determined and stored in step 205, $$S_A = (k_A d_A^{-1} + \overline{R}_A) d_A \bmod u. \quad (1.13)$$

The Bank may determine an implicit signature in a similar manner, $$S_B = (k_B d_B^{-1} + \overline{R}_B) d_B \bmod u. \quad (1.14)$$

Alice's processor then determines (step 218) a value for a shared secret key K using equation (1.7) and the Bank determines a value for a shared secret key K using equation (1.8).

Alice's processor may then encrypt a message (step 220) using the shared secret key K and transmit (step 222) the encrypted message to the Bank. Upon receiving the encrypted message, the Bank may use the shared secret key K to decrypt the message.

Note that, when applying the countermeasure as presented in equation (1.12), the processor performs a modular inversion operation, $d_A^{-1} \bmod u$, a first modular multiplication operation, $\chi = k_A d_A^{-1} \bmod u$, a modular addition operation, $\beta = (\chi + \overline{R}_A) \bmod u$, and a second modular multiplication operation, $S_A = \beta d_A \bmod u$ for a total of one modular inversion operation, two modular multiplication operations and one modular addition operation. Compared to the equation (1.4), which requires one modular multiplication operation and one modular addition operation, each execution of the countermeasure as presented in equation (1.12) involves only one additional modular multiplication operation. Notably, there is also an additional, one-time modular inversion operation.

As another countermeasure, an alternative to the use and storage of the modular inverse of the long-term private key and equation (1.12), equation (1.4) may also be rewritten using multiplicative splitting, i.e., $$S_A = [k_A + (\overline{R}_A \omega)(\omega^{-1} d_A)] \bmod u. \quad (1.15)$$

Since $\omega$ is unknown to an attacker, the modulus multiplication to determine $\omega^{-1} d_A \bmod u$ does not provide the attacker with any useful information. By executing the modulus multiplication to determine $\omega^{-1} d_A \bmod u$, the long-term private key is masked in subsequent operations.

Figure 3:
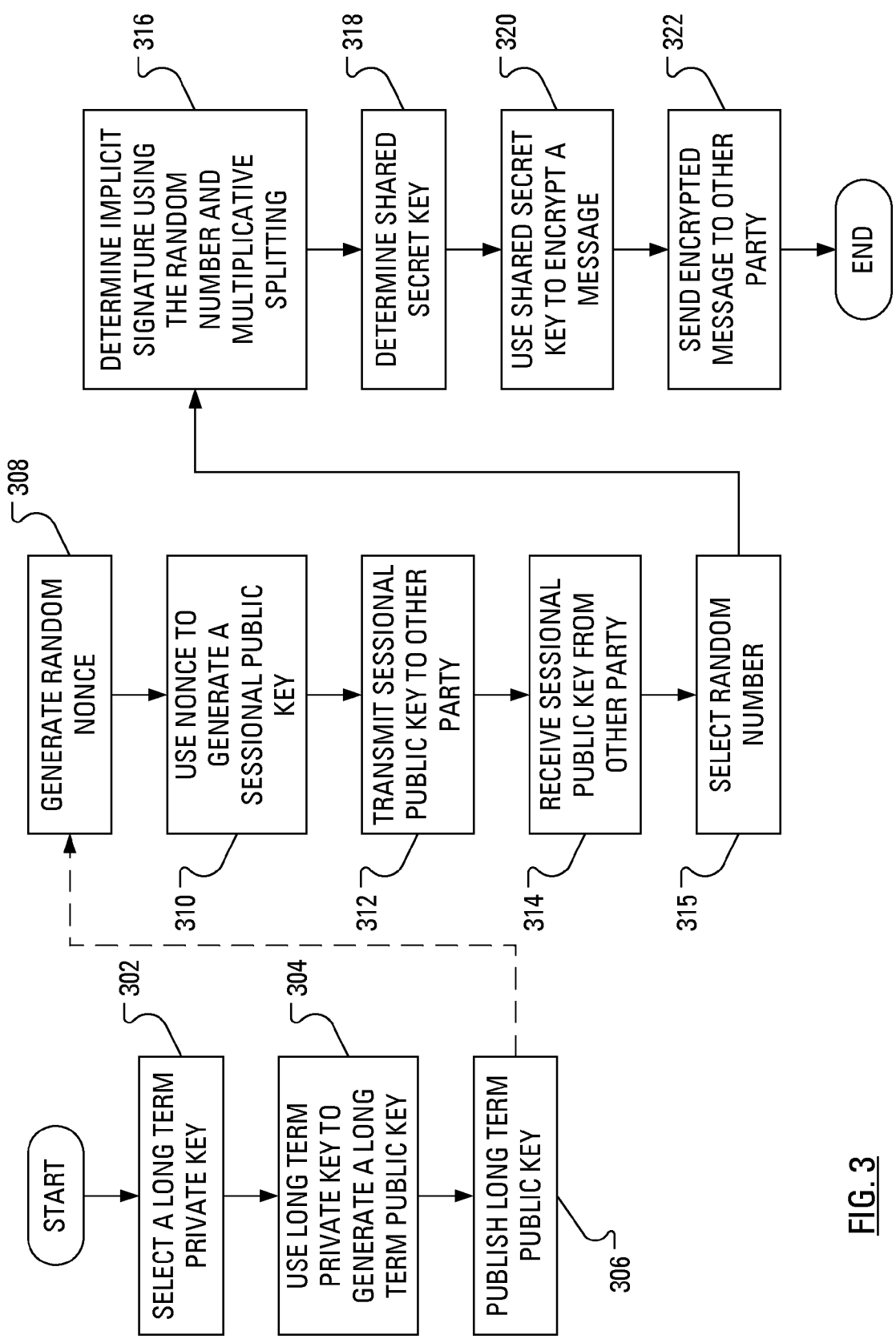
FIG. 3 illustrates steps of a second method of carrying out the ECMQV key agreement algorithm in a manner that counters a power analysis attack according to an embodiment.

Consider once again, this time in view of FIG. 3, execution of the ECMQV key agreement algorithm between Alice and her Bank. Initially, Alice's processor selects (step 302) a long-term private key, $d_A$, and uses the long-term private key to generate (step 304) a long-term public key, $Q_A$. Alice's processor then publishes (step 306) the public key $Q_A$ in some trusted manner so that the Bank receives Alice's public key.

At some later time, for a secure session with her Bank, Alice's processor generates a sessional key pair by first randomly generating a nonce $k_A$ (step 308) and then determining $R_A = k_A P$ (step 310), where $k_A$ is an integer, P is a base point on an elliptic curve and $R_A$ is another point on the same elliptic curve. Alice's processor then provides $R_A$ to the Bank (step 312) as a sessional public key. The Bank also generates a sessional key pair $(R_B, k_B)$ by randomly generating a nonce $k_B$ and determining $R_B = k_B P$. The Bank then provides $R_B$ to Alice as a sessional public key and Alice's processor receives (step 314) the Bank's sessional public key.

Alice's processor next selects (step 315) a random number, $\omega$, for use in the multiplicative splitting.

Alice's processor then determines (step 316) a value for the implicit signature, while using multiplicative splitting and the random number selected in step 315.

$$S_A = [k_A + (\overline{R}_A \omega)(\omega^{-1} d_A)] \bmod u. \quad (1.16)$$

The Bank may determine an implicit signature in a similar manner.

Alice's processor then determines (step 318) a value for a shared secret key K using equation (1.7) and the Bank determines a value for a shared secret key K using equation (1.8).

Alice's processor may then encrypt a message (step 320) using the shared secret key K and transmit (step 322) the encrypted message to the Bank. Upon receiving the encrypted message, the Bank may use the shared secret key K to decrypt the message.

Note that, when applying the countermeasure as presented in equation (1.16), the processor performs a modular inversion operation, $\omega^{-1} \bmod u$, a first modular multiplication operation, $\xi_1 = \omega^{-1} d_A \bmod u$, a second modular multiplication operation, $\xi_2 = \overline{R}_A \omega \bmod u$, a third modular multiplication operation, $\alpha = \xi_2 \xi_1 \bmod u$, and a modular addition operation, $S_A = (k_A + \alpha) \bmod u$ for a total of one modular inversion operation, three modular multiplication operations and one modular addition operation. Compared to the equation (1.4), which requires one modular multiplication operation and one modular addition operation, each execution of the countermeasure as presented in equation (1.12) involves one additional modular inversion operation and two additional modular multiplication operation.

Figure 4:
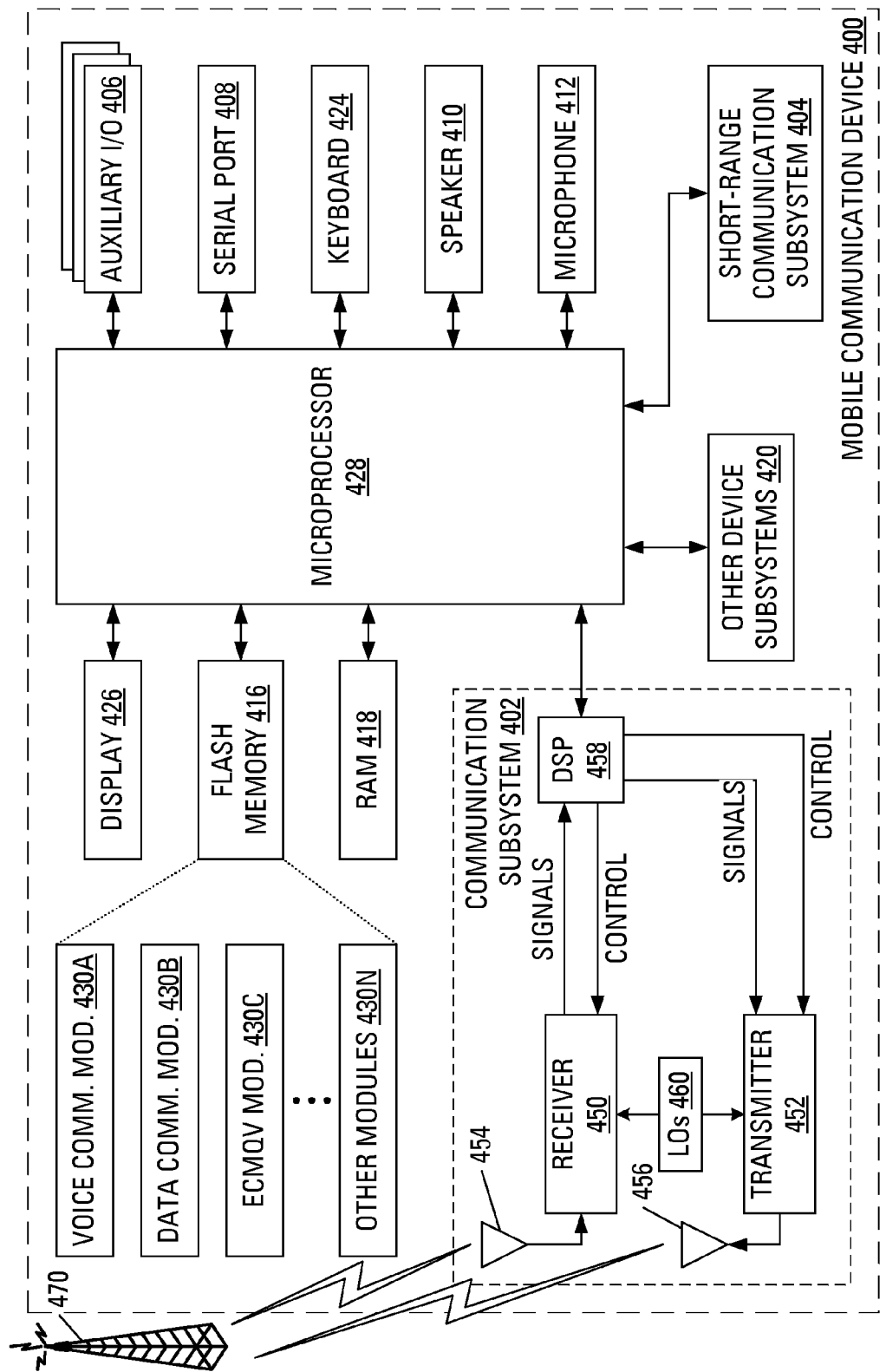
FIG. 4 illustrates an apparatus for carrying out the method of FIG. 1 or FIG. 2.

FIG. 4 illustrates a mobile communication device 400 as an example of a device that may carry out the methods of FIG. 2 and/or FIG. 3. The mobile communication device 400 includes a housing, an input device (e.g., a keyboard 424 having a plurality of keys) and an output device (e.g., a display 426), which may be a full graphic, or full color, Liquid Crystal Display (LCD). In some embodiments, the display 426 may comprise a touchscreen display. In such embodiments, the keyboard 424 may comprise a virtual keyboard. Other types of output devices may alternatively be utilized. A processing device (a microprocessor 428) is shown schematically in FIG. 4 as coupled between the keyboard 424 and the display 426. The microprocessor 428 controls the operation of the display 426, as well as the overall operation of the mobile communication device 400, in part, responsive to actuation of the keys on the keyboard 424 by a user.

The housing may be elongated vertically, or may take on other sizes and shapes (including clamshell housing structures). Where the keyboard 424 includes keys that are associated with at least one alphabetic character and at least one numeric character, the keyboard 424 may include a mode selection key, or other hardware or software, for switching between alphabetic entry and numeric entry.

In addition to the microprocessor 428, other parts of the mobile communication device 400 are shown schematically in FIG. 4. These may include: a communications subsystem 402, a short-range communications subsystem 404, the keyboard 424 and the display 426. The mobile communication device 400 may further include other input/output devices such as a set of auxiliary I/O devices 406, a serial port 408, a speaker 410 and a microphone 412. The mobile communication device 400 may also include memory devices, such as a flash memory 416 and a Random Access Memory (RAM) 418, and various other device subsystems 420. The mobile communication device 400 may comprise a two-way radio frequency (RF) communication device having voice and data communication capabilities. In addition, the mobile communication device 400 may have the capability to communicate with other computer systems via the Internet.

Operating system software executed by the microprocessor 428 may be stored in a computer readable medium, such as the flash memory 416, but may be stored in other types of memory devices, such as a read only memory (ROM) or similar storage element. In addition, system software, specific device applications, or parts thereof, may be temporarily loaded into a volatile store, such as the RAM 418. Communication signals received by the mobile device may also be stored to the RAM 418.

The microprocessor 428, in addition to its operating system functions, enables execution of software applications on the mobile communication device 400. A predetermined set of software applications that control basic device operations, such as a voice communications module 430A and a data communications module 430B, may be installed on the mobile communication device 400 during manufacture. A ECMQV module 430C may also be installed on the mobile communication device 400 during manufacture, to implement aspects of the present disclosure. As well, additional software modules, illustrated as an other software module 430N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 470 represented by a radio tower. The data items managed by the PIM application may be seamlessly integrated, synchronized and updated via the wireless carrier network 470 with the device user's corresponding data items stored or associated with a host computer system.

Communication functions, including data and voice communications, are performed through the communication subsystem 402 and, possibly, through the short-range communications subsystem 404. The communication subsystem 402 includes a receiver 450, a transmitter 452 and one or more antennas, illustrated as a receive antenna 454 and a transmit antenna 456. In addition, the communication subsystem 402 also includes a processing module, such as a digital signal processor (DSP) 458, and local oscillators (LOs) 460. The specific design and implementation of the communication subsystem 402 is dependent upon the communication network in which the mobile communication device 400 is intended to operate. For example, the communication subsystem 402 of the mobile communication device 400 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 400.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 400 may send and receive communication signals over the wireless carrier network 470. Signals received from the wireless carrier network 470 by the receive antenna 454 are routed to the receiver 450, which provides for signal amplification, frequency down conversion, filtering, channel selection, etc., and may also provide analog to digital conversion. Analog-to-digital conversion of the received signal allows the DSP 458 to perform more complex communication functions, such as demodulation and decoding. In a similar manner, signals to be transmitted to the wireless carrier network 470 are processed (e.g., modulated and encoded) by the DSP 458 and are then provided to the transmitter 452 for digital to analog conversion, frequency up conversion, filtering, amplification and transmission to the wireless carrier network 470 (or networks) via the transmit antenna 456.

In addition to processing communication signals, the DSP 458 provides for control of the receiver 450 and the transmitter 452. For example, gains applied to communication signals in the receiver 450 and the transmitter 452 may be adaptively controlled through automatic gain control algorithms implemented in the DSP 458.

In a data communication mode, a received signal, such as a text message or web page download, is processed by the communication subsystem 402 and is input to the microprocessor 428. The received signal is then further processed by the microprocessor 428 for output to the display 426, or alternatively to some auxiliary I/O devices 406. A device user may also compose data items, such as e-mail messages, using the keyboard 424 and/or some other auxiliary I/O device 406, such as a touchpad, a rocker switch, a thumb-wheel, a trackball, a touchscreen, or some other type of input device. The composed data items may then be transmitted over the wireless carrier network 470 via the communication subsystem 402.

In a voice communication mode, overall operation of the device is substantially similar to the data communication mode, except that received signals are output to a speaker 410, and signals for transmission are generated by a microphone 412. Alternative voice or audio I/O subsystems, such as a voice message recording subsystem, may also be implemented on the mobile communication device 400. In addition, the display 426 may also be utilized in voice communication mode, for example, to display the identity of a calling party, the duration of a voice call, or other voice call related information.

The short-range communications subsystem 404 enables communication between the mobile communication device 400 and other proximate systems or devices, which need not necessarily be similar devices. For example, the short-range communications subsystem may include an infrared device and associated circuits and components, or a Bluetooth™ communication module to provide for communication with similarly-enabled systems and devices.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of encrypting a message in a manner that counters power analysis attacks, wherein a long-term private cryptographic key has been selected and a long-term public cryptographic key has been determined based on the long-term private cryptographic key and a base point on a given elliptic curve, the base point having a prime order, the method comprising:
   determining a modular inverse of the long-term private cryptographic key;
   generating a sessional private cryptographic key and a sessional public cryptographic key;
   determining an implicit signature based on the modular inverse of the long-term private cryptographic key, the sessional private cryptographic key, the sessional public cryptographic key and the long-term private cryptographic key;
   determining a shared secret cryptographic key based on the implicit signature; and
   encrypting a message using the shared secret cryptographic key;
   wherein determining the implicit signature comprises evaluating:

$$S_A = (k_A d_A^{-1} + \overline{R}_A) d_A \bmod u$$

wherein
   $S_A$ is the implicit signature;
   $k_A$ is the sessional private cryptographic key;
   $d_A^{-1}$ is the modular inverse of the long-term cryptographic key;
   $d_A$ is the long-term cryptographic key;
   $\overline{R}_A$ is a function of the sessional public cryptographic key, $R_A$; and
   u is the order of the base point.

2. The method of claim 1 wherein the generating the sessional public cryptographic key comprises executing an elliptic curve scalar multiplication of the sessional private cryptographic key and the base point.

3. The method of claim 1 wherein the encrypting produces an encrypted message and the method further comprises transmitting the encrypted message to a destination.

4. The method of claim 3 further comprising receiving, from the destination:
   a long-term destination public cryptographic key; and
   a sessional destination public cryptographic key.

5. The method of claim 4 wherein the determining the shared secret cryptographic key comprises evaluating $$K_A = h S_A (R_B + \overline{R}_B Q_B)$$

wherein
   $K_A$ is the shared secret cryptographic key;
   h is a co-factor;
   $S_A$ is the implicit signature;
   $R_B$ is the sessional public cryptographic key;
   $\overline{R}_B$ is a function of the sessional destination public cryptographic key; and
   $Q_B$ is the long-term destination public cryptographic key.

6. A mobile communication device for encrypting a message in a manner that counters power analysis attacks, wherein a long-term private cryptographic key has been selected and a long-term public cryptographic key has been determined based on the long-term private cryptographic key and a base point on a given elliptic curve, the base point having a prime order, the mobile communication device comprising:
   a processor adapted to:
      determine a modular inverse of the long-term private cryptographic key;
      generate a sessional private cryptographic key and a sessional public cryptographic key;
      determine an implicit signature based on the modular inverse of the long-term private cryptographic key, the sessional private cryptographic key, the sessional public cryptographic key and the long-term private cryptographic key;
      determine a shared secret cryptographic key based on the implicit signature; and
      encrypt a message using the shared secret cryptographic key;
   wherein determining the implicit signature comprises evaluating:

$$S_A = (k_A d_A^{-1} + \overline{R}_A) d_A \bmod u$$

wherein
   $S_A$ is the implicit signature;
   $k_A$ is the sessional private cryptographic key;
   $d_A^{-1}$ is the modular inverse of the long-term cryptographic key;
   $d_A$ is the long-term cryptographic key;
   $\overline{R}_A$ is a function of the sessional public cryptographic key, $R_A$; and
   u is the order of the base point.

7. A non-transitory computer readable medium containing computer-executable instructions that, when performed by a processor given a long-term private cryptographic key and a long-term public cryptographic key, which has been determined based on the long-term private cryptographic key and a base point on a given elliptic curve, the base point having a prime order, cause the processor to:
   determine a modular inverse of the long-term private cryptographic key;
   generate a sessional private cryptographic key and a sessional public cryptographic key;

determine an implicit signature based on the sessional private cryptographic key, the sessional public cryptographic key, the long-term private cryptographic key and the modular inverse of the long-term private cryptographic key;

determine a shared secret cryptographic key based on the implicit signature; and encrypt a message using the shared secret cryptographic key;

wherein determining the implicit signature comprises evaluating:

$$S_A = (k_A d_A^{-1} + \overline{R}_A) d_A \bmod u$$

wherein $S_A$ is the implicit signature;

$k_A$ is the sessional private cryptographic key;

$d_A^{-1}$ is the modular inverse of the long-term cryptographic key;

$d_A$ is the long-term cryptographic key;

$\overline{R}_A$ is a function of the sessional public cryptographic key, $R_A$; and u is the order of the base point.

* * * * *